(12) United States Patent
Fang et al.

(10) Patent No.: US 11,512,864 B2
(45) Date of Patent: Nov. 29, 2022

(54) DEEP SPATIAL-TEMPORAL SIMILARITY METHOD FOR AIR QUALITY PREDICTION

(71) Applicant: Jiangnan University, Wuxi (CN)

(72) Inventors: Wei Fang, Wuxi (CN); Runsu Zhu, Wuxi (CN); Hengyang Lu, Wuxi (CN); Xin Zhang, Wuxi (CN); Jun Sun, Wuxi (CN); Xiaojun Wu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 17/841,775

(22) Filed: Jun. 16, 2022

(65) Prior Publication Data

US 2022/0316734 A1    Oct. 6, 2022

Related U.S. Application Data

(63) Continuation of application No. PCT/CN2021/119789, filed on Sep. 23, 2021.

(30) Foreign Application Priority Data

Apr. 14, 2021  (CN) .......................... 202110400908.1

(51) Int. Cl.
*G06Q 10/06* (2012.01)
*G06Q 10/04* (2012.01)
(Continued)

(52) U.S. Cl.
CPC .............. *F24F 11/49* (2018.01); *F24F 11/39* (2018.01); *G06F 17/00* (2013.01); *G06N 20/00* (2019.01);
(Continued)

(58) Field of Classification Search
None
See application file for complete search history.

(56) References Cited

U.S. PATENT DOCUMENTS

2019/0325334 A1* 10/2019 Kuo .................. G06N 20/00
2022/0270464 A1*  8/2022 Tauten ................ G06K 7/1417

FOREIGN PATENT DOCUMENTS

CN     109214592 A   *  1/2019   ............. G06Q 10/04
CN     110189026 A   *  8/2019   ............. G06Q 10/06
(Continued)

OTHER PUBLICATIONS

Mia,Jue et al. "Air quality prediction at new stations using spatially tranferred bi-directional long short-term memory network." Science of Total Enviroment 705(2020)135771, Nov. 26, 2019.

*Primary Examiner* — Ronald D Hartman, Jr.
(74) *Attorney, Agent, or Firm* — IPro, PLLC; Na Xu

(57) ABSTRACT

The present disclosure discloses a deep spatial-temporal similarity method for air quality prediction, and belongs to the technical field of environmental protection. When the method predicts air quality-related indexes of a target site, a temporal change of air pollution and a spatial diffusion relationship are effectively combined, and then spatial-temporal similarity sites of the target site are selected; air quality monitoring data collected by the target site, the spatial-temporal similarity site of the target site and geographical neighbour sites of the target site and meteorological data are respectively taken as inputs of a long short term memory network (LSTM) model to obtain uncorrelated output results, and then predicted values of air quality-related index data of the target site are obtained in a mode of support vector regression (SVR) integration. The present disclosure effectively combines the temporal change of air pollution with the spatial diffusion relationship, and namely proposes a more efficient way to select more highly relevant data to predict air quality so that a prediction result is more accurate.

10 Claims, 14 Drawing Sheets

(51) Int. Cl.
*G06N 20/00* (2019.01)
*G06F 17/00* (2019.01)
*F24F 11/49* (2018.01)
*F24F 11/39* (2018.01)
*F24F 110/65* (2018.01)

(52) U.S. Cl.
CPC ............ *G06Q 10/04* (2013.01); *G06Q 10/06* (2013.01); *F24F 2110/65* (2018.01)

(56) References Cited

FOREIGN PATENT DOCUMENTS

| | | | | | |
|---|---|---|---|---|---|
| CN | 110263479 | A | * | 9/2019 | ............ G06F 17/00 |
| CN | 111340288 | A | * | 6/2020 | ............ G06Q 10/04 |
| CN | 111798051 | A | * | 10/2020 | ............ G06Q 10/04 |
| CN | 112183625 | A | | 1/2021 | |
| CN | 112465243 | A | * | 3/2021 | ............ G06Q 10/04 |
| CN | 112884243 | A | * | 6/2021 | ............ G06Q 10/04 |
| CN | 113077097 | A | | 7/2021 | |
| WO | WO-2022069466 | A1 | * | 4/2022 | |

* cited by examiner

DEEP SPATIAL-TEMPORAL SIMILARITY METHOD FOR AIR QUALITY PREDICTION

TECHNICAL FIELD

The present disclosure herein relates to a deep spatial-temporal similarity method for air quality prediction, and belongs to the technical field of environmental protection.

BACKGROUND

In order to solve the increasing air pollution problem, a number of methods and models have been proposed by people to predict air quality, and can be divided into three types of an empirical model, a parametric or non-parametric model, and an integrated model.

The empirical model mainly consists of a persistence method, a climatological method and an empirical method. The persistence approach is based on the assumption that predicted values are consistent with historical contaminant levels; the climatological method is based on the assumption that air quality is highly dependent on weather; both of the methods are not independent methods and are low in accuracy. The empirical method is based on the premise that a predicted threshold of meteorological variables can indicate a high pollution concentration in the future. Compared with the previous two methods, this method is more effective in the case of high pollution, but the effect is less satisfactory more often. In addition, the three methods mentioned above are poor in prediction effect, and it is not easy to build their models.

The parametric and non-parametric models are models for air quality prediction by parametric or non-parametric statistical methods. Such models require large amounts of data to support them. Common methods are linear regression, Gaussian process regression, a regression tree and so on, and their prediction accuracy is improved compared with that of the empirical model, but the prediction effect is not ideal for a complex situation. The rise of an artificial neural network (ANN) makes people think to use it to solve the non-linear problem of air quality prediction, improved methods based on ANN are continuously proposed, and these methods improve the prediction accuracy of the parametric model to a certain extent. However, the prediction accuracy of these methods is within the acceptable range only under general conditions, but for weather conditions in short-term large fluctuations, it is difficult to achieve a good prediction result by such models.

An integrated model is the latest class of models. This type of model makes comprehensive use of global data, such as a hybrid model proposed by Deyun Wang (D. Wang, S. Wei, H. Luo, C. Yue, and O. Grunder, "A novel hybrid model for air quality index forecasting based on two-phase decomposition technique and modified extreme learning machine", Sci Total Environ, vol. 580, pp. 719-733, Feb. 15, 2017.), but this type of model only analyzes the time series itself, and is very poor in compatibility with environmental changes. A spatial-temporal classifier integration model proposed by Zheng Yu (Y. Zheng, F. Liu, and H.-P. Hsieh, "U-air: When urban air quality inference meets big data", in Proceedings of the 19th ACM SIGKDD international conference on Knowledge discovery and data mining, 2013, pp. 1436-1444: ACM.) has taken global information into consideration, then Hsieh proposed a station location recommendation method based on big data (H.-P. Hsieh, S.-D. Lin, and Y. Zheng, "Inferring air quality for station location recommendation based on urban big data", in Proceedings of the 21 th ACM SIGKDD International Conference on Knowledge Discovery and Data Mining, 2015, pp. 437-446: ACM.), since then, Zheng Yu proposed a data-driven integration model FFA (Y. Zheng et al. "Forecasting fine-grained air quality based on big data", in Proceedings of the 21 th ACM SIGKDD International Conference on Knowledge Discovery and Data Mining, 2015, pp. 2267-2276: ACM.) using a time series regression model and a neural network spatial model. Then Junshan Wang proposed a deep spatial-temporal integration model STE based on weather classification, (J. Wang and G. Song, "A Deep Spatial-Temporal Ensemble Model for Air Quality Prediction", neurocomputing, vol. 314, pp. 198-206, 2018.), which improves the model accuracy by retraining the weather classification. However, in the above-mentioned models, the model classification accuracy is improved by processing and analyzing the global data, and the influence of the global data on each index involved in air quality prediction is not completely consistent, and the above-mentioned models did not consider site data for finding. Ping-WEI proposed effective site selection based on distance (P.-W. Soh, J.-W. Chang, and J.-W. Huang, "Adaptive Deep Learning-Based Air Quality Prediction Model Using the Most Relevant Spatial-Temporal Relations", IEEE Access, vol. 6, pp. 38186-38199, 2018.), but ignored that the influence of different factors on the predicted value is not completely the same. An AQI grade prediction model based on a spatial-temporal optimization deep neural network proposed by Dong Ting, et al. (Dong Ting, Zhao Jianhui, and Hu Yong, "AQI Grade Prediction Based on Spatial-Temporal Optimization Deep Neural Network", Computer Engineering and Application, vol. 53, no. 21, pp. 17-23, 2017.) focuses on using deep learning to improve a noise reduction method, and pays attention to improving the effectiveness of data rather than selecting effective data.

In conclusion, the prediction accuracy of the existing methods for air quality prediction needs to be further improved.

SUMMARY

In order to solve the problem of low prediction accuracy of existing air quality prediction methods, the present disclosure provides a deep spatial-temporal similarity method for air quality prediction, by proposing a new spatial-temporal similarity selection algorithm to select data with higher spatial-temporal similarity to be input into an LSTM network, the method is used for predicting air quality-related index data of a target site, and the method includes:

S1 acquiring air quality monitoring data collected by each air quality monitoring site and meteorological data, the air quality monitoring data including historical data of CO, $NO_2$, $SO_2$, $O_3$, PM10 and PM2.5, and the meteorological data including historical data of temperature, humidity, wind speed and wind direction;

S2 determining similarity coefficients between each monitoring target in air quality monitoring data collected by the target site and the meteorological data and predicted air quality-related indexes according to an improved Granger causality;

S3 using a dynamic time folding method to calculate a similarity value between each monitoring target in the air quality monitoring data collected by each site and the meteorological data and a corresponding monitoring target collected by the target site;

S4 determining spatial-temporal similarity between each air quality monitoring site and the target site according to the similarity coefficient determined in S2 and the similarity value determined in S3;

S5 selecting a predetermined number of air quality monitoring sites as spatial-temporal similarity sites of the target site according to a magnitude of the spatial-temporal similarity between each air quality monitoring site and the target site determined in S4; and S6 taking the air quality monitoring data collected by the target site and the meteorological data, air quality monitoring data collected by the spatial-temporal similarity site of the target site and the meteorological data, and air quality monitoring data collected by geographical neighbour sites determined according to location information and the meteorological data as inputs of a long short term memory network (LSTM) model respectively to obtain corresponding output results, and then performing support vector regression (SVR) integration on each output result corresponding to the LSTM model to obtain predicted values of the air quality-related index data of the target site;

the air quality-related index being any monitoring target in the air quality monitoring data.

Optionally, determining the similarity coefficients between each monitoring target in the air quality monitoring data collected by the target site and the meteorological data and the predicted air quality-related indexes according to the improved Granger causality includes:

determining the similarity coefficient between each monitoring target in the air quality monitoring data collected by the target site and the meteorological data and the predicted air quality-related index according to Formula (3), and constituting a weight vector W:

$$W = SGC(A, B) \quad (1)$$

where A represents the predicted air quality-related index, and B represents other monitoring targets other than the air quality-related index in the air quality monitoring data collected by the target site and the meteorological data.

Optionally, determining the similarity coefficient between each monitoring target in the air quality monitoring data and the meteorological data and the predicted air quality-related index according to Formula (1) includes:

acquiring the air quality monitoring data collected by the target site and the meteorological data; performing linear regression processing on the air quality monitoring data collected by the target site and the meteorological data twice to obtain the similarity coefficient between each monitoring target and the predicted air quality-related index:

S2.1, selecting m historical data in sequence according to time to constitute A and B:

$$A = [a_1, a_2, \ldots, a_p, \ldots, a_{m-1}, a_m]^T$$

$$B = [b_1, b_2, \ldots, b_q, \ldots, b_{m-1}, b_m]^T$$

where $a_p$ represents the historical data of the air quality-related index in the air quality monitoring data collected by the target site; $b_q$ represents the historical data of the other monitoring targets other than the air quality-related index in the air quality monitoring data collected by the target site and the meteorological data; m represents a number of the historical data;

S2.2, performing first-time linear regression operation:

selecting i+1 to $m_{th}$ data in A to constitute $A_{1,i} = [a_{i+1}, a_{i+2}, \ldots, a_m]^T$;

generating a lag matrix $Z_{1,i}$ according to the data in A:

$$Z_{1,i} = \begin{pmatrix} 1 & a_i & a_{i-1} & \ldots & a_1 \\ 1 & a_{i+1} & a_i & \ldots & a_2 \\ \vdots & \vdots & \vdots & \vdots & \vdots \\ 1 & a_{m-1} & a_{m-2} & \ldots & a_{m-i-1} \end{pmatrix}$$

where i is lag time in the first-time linear regression operation, $i \in (0, L]$, and L is maximum lag time;

obtaining an error corresponding to the lag time i according to the following formula:

$$e_{1,i} = f_{LR}(A_{1,i} | Z_{1,i})$$

obtaining an error vector $e_1 = \{e_{1,i}\}$; $f_{LR}$ representing linear regression operation;

taking a minimum error vector $e_{1,s} = \min(e_1)$, where s is lag time corresponding to a minimum value in the error vector $e_1$;

S2.3, performing second-time linear regression operation:

selecting j+s+1 to $m_{th}$ data in A to constitute $A_{2,j} = [a_{j+s+1}, a_{j+s+2}, \ldots, a_m]^T$;

generating a lag matrix $Z_{2,j}$ according to the data in A and B:

$$Z_{2,j} = \begin{pmatrix} 1 & a_{j+s} & \ldots & a_{j+1} & b_{j+s+1} & \ldots & b_{s+1} \\ \vdots & \vdots & \vdots & \vdots & \vdots & \vdots & \vdots \\ 1 & a_{m-1} & \ldots & a_{m-s} & b_m & \ldots & b_{m-j+1} \end{pmatrix}$$

where j is lag time in the second-time linear regression operation, $j \in (0, s]$;

obtaining an error corresponding to the lag time j according to the following formula:

$$e_{2,j} = f_{LR}(A_{2,j} | Z_{2,j})$$

obtaining an error vector $e2 = \{e_{2,j}\}$;

taking a smallest error vector $e_{2,final} = \min(e_2)$ in e2;

S2.4, mapping $e_{2,final}$ into an interval of (0,1]:

$$I = \frac{1}{1 + e_{2,fianl}}$$

and using I as the similarity coefficient between each corresponding monitoring target and the predicted air quality-related index.

Optionally, determining the spatial-temporal similarity between each air quality monitoring site and the target site according to the similarity coefficient determined in S2 and the similarity value determined in S3 includes:

recording a vector composed of the similarity values between each monitoring target in the air quality monitoring data and the meteorological data and the corresponding monitoring target collected by the target site calculated in S3 as $DTW_R$;

recording a vector composed of the similarity coefficients between each monitoring target in the air quality monitoring data and the meteorological data and the predicted air quality-related index determined in S2 as a weight vector W; and multiplying the weight vector W by the distance vector $DTW_R$ to take a reciprocal to obtain the spatial-temporal similarity between each air quality monitoring site and the target site.

Optionally, using the dynamic time folding method to calculate the similarity value between each monitoring target in the air quality monitoring data collected by each site and the meteorological data and the corresponding monitoring target collected by the target site includes:

taking the historical data of the same monitoring index collected by the target site and any site of other sites respectively as R and T:

$$R = r_1, r_2, \ldots, r_p, \ldots, r_m$$

$$T = t_1, t_2, \ldots, t_q, \ldots, t_m$$

constructing to obtain a m×m matrix, matrix elements (p,q) representing a distance $d(r_p, t_q)$ between two points of $r_p$ and $t_q$;

performing a DTW process on the constructed m×m matrix to obtain a DTW distance as a similarity value of the corresponding monitoring index.

Optionally, the distance $d(r_p, t_q)$ is an Euclidean distance between the two points of $r_p$ and $t_q$.

Optionally, after the S1 and before S2: pre-processing the air quality monitoring data collected by each air quality monitoring site and the meteorological data acquired in S1 is further included.

Optionally, the pre-processing includes:
complementing missing data by using a method of interpolation or mean values.

Optionally, taking the air quality monitoring data collected by the target site and the meteorological data, the air quality monitoring data collected by the spatial-temporal similarity site of the target site and the meteorological data, and the air quality monitoring data collected by the geographical neighbour sites determined according to the location information and the meteorological data as the inputs of the long short term memory network (LSTM) model respectively includes:

taking the historical data of the air quality-related indexes in the air quality monitoring data collected by the target site as input data of the LSTM model to obtain a first output result;

taking the historical data of the monitoring targets other than the air quality-related indexes in the air quality monitoring data collected by the target site and the historical data of the meteorological data as input data of the LSTM model to obtain a second output result;

taking the historical data of the air quality-related indexes in the air quality monitoring data collected by the spatial-temporal similarity site of the target site as input data of the LSTM model to obtain a third output result;

taking the historical data of the monitoring target other than the air quality-related indexes in the air quality monitoring data collected by the spatial-temporal similarity site of the target site and the historical data of the meteorological data as input data of the LSTM model to obtain a fourth output result; and taking the air quality monitoring data collected by the geographical neighbour site determined according to the location information and the historical data of the meteorological data as input data of the LSTM model to obtain a fifth output result.

Optionally, performing support vector regression (SVR) integration on each output result corresponding to the LSTM model to obtain the predicted values of the air quality-related index data of the target site includes:

performing support vector regression (SVR) integration on the first output result to the fifth output result of the LSTM model to obtain the predicted values of the air quality-related index data of the target site.

The present disclosure has the beneficial effects.

In the present disclosure, when predicting the air quality-related index of the target site, a temporal change of air pollution and a spatial diffusion relationship are effectively combined, and then the spatial-temporal similarity sites of the target site are selected; the air quality monitoring data collected by the target site, the spatial-temporal similarity site of the target site and the geographical neighbour sites of the target site and the meteorological data are respectively taken as inputs of the long short term memory network (LSTM) model to obtain uncorrelated output results, and then the predicted values of the air quality-related index data of the target site are obtained in a mode of support vector regression (SVR) integration. The present disclosure effectively combines the temporal change of air pollution with the spatial diffusion relationship, and namely proposes a more efficient way to select more highly relevant data to predict air quality so that a prediction result is more accurate; in the process of selecting the spatial-temporal similarity site, the present disclosure obtains the similarity coefficient between each monitoring target and the air quality-related index to be predicted by improving the Granger causality, and then uses the dynamic time folding method to calculate the similarity value between each monitoring target in the air quality monitoring data collected by each site and the meteorological data and the corresponding monitoring target collected by the target site, and integrates the similarity coefficient between each monitoring target and the air quality-related index to be predicted, and the similarity value between each monitoring target in the air quality monitoring data collected by each site and the meteorological data and the corresponding monitoring target collected by the target site to obtain the spatial-temporal similarity between each air quality monitoring site and the target site, and then selects the spatial-temporal similarity site of the target site, so as to provide an essential preparation for accurately predicting the air quality-related index

BRIEF DESCRIPTION OF FIGURES

In order to illustrate the technical solutions in the example of the present disclosure more clearly, the following will briefly introduce the accompanying drawings needing to be used in the description of the examples. Obviously, the accompanying drawings in the following description are only some examples of the present disclosure. For those of ordinary skill in the art, other drawings can also be obtained according to these drawings without any creative effort.

DETAILED DESCRIPTION

Figure 1:
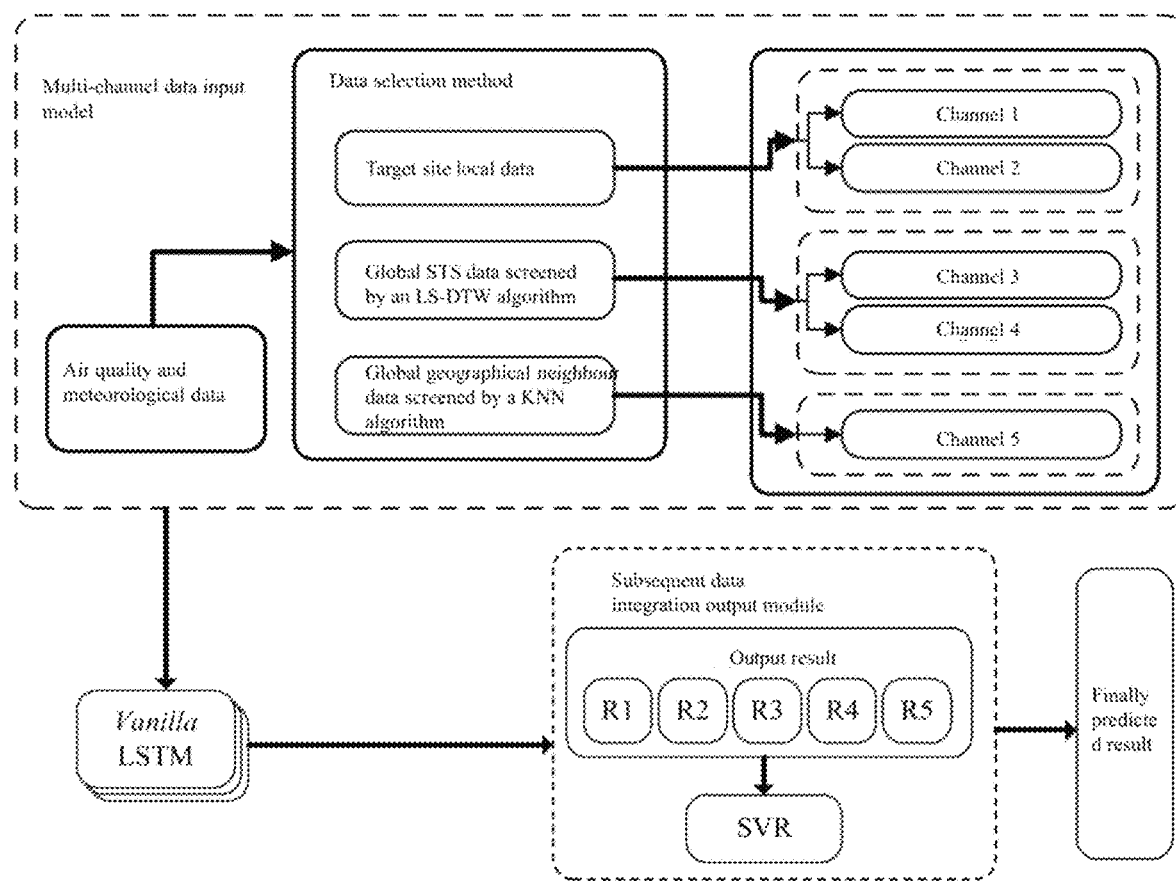
FIG. 1 is a structural diagram of a Deep-STS model.

In order to make the objects, technical solutions and advantages of the present disclosure more clear, implementations of the present disclosure will be described below in detail with reference to the accompanying drawings.

Example 1

This example provides a deep spatial-temporal similarity method for air quality prediction, the method is used for predicting air quality-related index data of a target site, and the method includes:

S1 acquiring air quality monitoring data collected by each air quality monitoring site and meteorological data, the air quality monitoring data including historical data of CO, $NO_2$, $SO_2$, $O_3$, PM10 and PM2.5, and the meteorological data including historical data of temperature, humidity, wind speed and wind direction;

S2 determining similarity coefficients between each monitoring target in air quality monitoring data collected by the target site and the meteorological data and predicted air quality-related indexes according to an improved Granger causality;

S3 using a dynamic time folding method to calculate a similarity value between each monitoring target in the air quality monitoring data collected by each site and the meteorological data and a corresponding monitoring target collected by the target site;

S4 determining spatial-temporal similarity between each air quality monitoring site and the target site according to the similarity coefficient determined in S2 and the similarity value determined in S3;

S5 selecting a predetermined number of air quality monitoring sites as spatial-temporal similarity sites of the target site according to a magnitude of the spatial-temporal similarity between each air quality monitoring site and the target site determined in S4; and S6 taking the air quality monitoring data collected by the target site and the meteorological data, air quality monitoring data collected by the spatial-temporal similarity site of the target site and the meteorological data, and air quality monitoring data collected by geographical neighbour sites determined according to location information and the meteorological data as inputs respectively of a long short term memory network (LSTM) model respectively to obtain corresponding output results, and then performing support vector regression (SVR) integration on each output result corresponding to the LSTM model to obtain predicted values of the air quality-related index data of the target site;

The air quality-related index is any monitoring target in the air quality monitoring data, for example, if PM2.5 is to be predicted, in the above-mentioned S2, the similarity coefficients between CO, $NO_2$, $SO_2$, $O_3$, PM10 and PM2.5, and the meteorological data including the temperature, humidity, wind speed and wind direction and PM2.5 are determined; where the similarity coefficient between PM2.5 and itself is 1; the calculation process of the similarity coefficients between CO, $NO_2$, $SO_2$, $O_3$, PM10 the temperature, the humidity, the wind speed and the wind direction and PM2.5 is as follows, and the calculation process of the similarity coefficient between PM10 and PM2.5 is described as an example:

S2.1, selecting m historical data in sequence according to time to constitute A and B;

$$A=[a_1,a_2,\ldots,a_p,\ldots,a_{m-1},a_m]^T$$

$$B=[b_1,b_2,\ldots,b_q,\ldots,b_{m-1},b_m]^T$$

where $a_p$ represents the historical data of PM2.5 collected by the target site; $b_q$ represents the historical data of PM10 collected by the target site; m represents a number of the historical data;

S2.2, performing first-time linear regression operation:

selecting i+1 to $m_{th}$ data in A to constitute $A_{1,i}=[a_{i+1}, a_{i+2},\ldots,a_m]^T$, generating a lag matrix $Z_{1,i}$ according to the data in A;

$$Z_{1,i} = \begin{pmatrix} 1 & a_i & a_{i-1} & \ldots & a_1 \\ 1 & a_{i+1} & a_i & \ldots & a_2 \\ \vdots & \vdots & \vdots & \vdots & \vdots \\ 1 & a_{m-1} & a_{m-2} & \ldots & a_{m-i-1} \end{pmatrix}$$

where i is lag time in the first-time linear regression operation, $i\in(0,L]$, and L is maximum lag time, showing a predicted value of PM2.5 after the predictable time L of the target site.

Obtaining an error corresponding to the lag time i according to the following formula:

$$e_{1,i}=f_{LR}(A_{1,i}|Z_{1,i})$$

obtaining an error vector $e_1=\{e_{1,i}\}$; $f_{LR}$ representing linear regression operation;

taking a minimum error vector $e_{1,s}=\min(e_1)$, where s is lag time corresponding to a minimum value in the error vector $e_1$;

S2.3, performing second-time linear regression operation:

selecting j+s+1 to $m_{th}$ data in A to constitute $A_{2,j}=[a_{j+s+1}, a_{j+s+2},\ldots,a_m]^T$;

generating a lag matrix $Z_{2,j}$ according to the data in A and B:

$$Z_{2,j} = \begin{pmatrix} 1 & a_{j+s} & \ldots & a_{j+1} & b_{j+s+1} & \ldots & b_{s+1} \\ \vdots & \vdots & \vdots & \vdots & \vdots & \vdots & \vdots \\ 1 & a_{m-1} & \ldots & a_{m-s} & b_m & \ldots & b_{m-j+1} \end{pmatrix}$$

where j is lag time in the second-time linear regression operation, $j\in(0,s]$;

obtaining an error corresponding to the lag time j according to the following formula:

$$e_{2,j}=f_{LR}(A_{2,j}|Z_{2,j})$$

obtaining an error vector $e2=\{e_{2,j}\}$;

taking a smallest error vector $e_{2,final}=\min(e_2)$ in e2;

S2.4, mapping $e_{2,final}$ into an interval of (0,1]:

$$I = \frac{1}{1 + e_{2,final}}$$

and using I as the similarity coefficient between corresponding PM10 and PM2.5.

The calculation process of the similarity coefficients between CO, $NO_2$, $SO_2$, $O_3$, the temperature, the humidity, the wind speed and the wind direction and PM2.5 refers to the above-mentioned calculation process of the similarity coefficient between PM10 and PM2.5.

Example 2

This example provides a deep spatial-temporal similarity method for air quality prediction, this example takes 35 air quality monitoring sites in a certain city as an example for illustration, and the method includes:

S1 acquiring air quality monitoring data collected by each air quality monitoring site and meteorological data, the air quality monitoring data including historical data of CO, $NO_2$, $SO_2$, $O_3$, PM10 and PM2.5, and the meteorological data including historical data of temperature, humidity, wind speed and wind direction;

S2 determining similarity coefficients between each monitoring target in air quality monitoring data collected by the target site and the meteorological data and predicted air quality-related indexes according to an improved Granger causality;

S3 using a dynamic time folding method to calculate a similarity value between each monitoring target in the air quality monitoring data collected by each site and the meteorological data and a corresponding monitoring target collected by the target site;

S4 determining spatial-temporal similarity between each air quality monitoring site and the target site according to the similarity coefficient determined in S2 and the similarity value determined in S3;

S5 selecting a predetermined number of air quality monitoring sites as spatial-temporal similarity sites of the target site according to a magnitude of the spatial-temporal similarity between each air quality monitoring site and the target site determined in S4; and S6 taking the air quality monitoring data collected by the target site and the meteorological data, air quality monitoring data collected by the spatial-temporal similarity site of the target site and the meteorological data, and air quality monitoring data collected by geographical neighbour sites determined according to location information and the meteorological data as inputs of a long short term memory network (LSTM) model respectively to obtain corresponding output results, and then performing support vector regression (SVR) integration on each output result corresponding to the LSTM model to obtain predicted values of the air quality-related index data of the target site;

the air quality-related index being any monitoring target in the air quality monitoring data.

Specifically, please refer to FIG. 1, after acquiring the air quality monitoring data collected by each air quality monitoring site and the meteorological data in S1, pre-processing the data, and in the preprocessing process, using a method of interpolation to complement missing small-scale data; and using mean values to fill large area missing data.

Then determining the spatial-temporal similarity site of the target site through the above-mentioned steps S2-S5, and the air quality monitoring data collected by the spatial-temporal similarity site and the meteorological data are used as global spatial-temporal similarity (STS) data screened by an LS-DTW algorithm in FIG. 1; local data of the target site in FIG. 1 is the air quality monitoring data collected by the target site itself and the meteorological data; a KNN algorithm in FIG. 1 screens global geographical neighbour data, namely, the air quality monitoring data collected by the geographical neighbour sites determined according to the location information and the meteorological data.

Channels 1 to 5 in FIG. 1 are input channels for the LSTM model.

Specifically, taking the historical data of the air quality-related indexes in the air quality monitoring data collected by the target site as input data of the channel 1 of the LSTM model;

taking the historical data of the monitoring targets other than the air quality-related indexes in the air quality monitoring data collected by the target site and the historical data of the meteorological data as input data of the channel 2 of the LSTM model;

Taking the historical data of the air quality-related indexes in the air quality monitoring data collected by the spatial-temporal similarity site of the target site as input data of the channel 3 of the LSTM model;

Taking the historical data of the monitoring target other than the air quality-related indexes in the air quality monitoring data collected by the spatial-temporal similarity site of the target site and the historical data of the meteorological data as input data of the channel 4 of the LSTM model; and taking the air quality monitoring data collected by the geographical neighbour site determined according to the location information and the historical data of the meteorological data as input data of the channel 5 of the LSTM model.

The data input to the five channels are respectively used as the input of the LSTM model to obtain five corresponding output results, and each output result is subjected to support vector regression (SVR) integration to obtain the predicted value of the air quality-related index data of the target site.

Introduction of the LSTM model can refer to "Greff K, Srivastava R K, Koutník J, et al. LSTM: A search space odyssey[J]. IEEE transactions on neural networks and learning systems, 2016, 28(10): 2222-2232". This model is not changed in the present application, and will not be described again here.

The support vector regression (SVR) integration process can refer to "Drucker H, Burges C J C, Kaufman L, et al. Support vector regression machines [J]. Advances in neural information processing systems, 1997, 9: 155-161", and will not be described again in this application.

In the process of determining the spatial-temporal similarity site of the target site through the steps S2-S5 in the present application, firstly, obtaining the similarity coefficient 1 between each monitoring target in the air quality monitoring data and the meteorological data and the predicted air quality-related index through the steps S2.1 to S2.4 in Example 1, and constituting a weight vector W.

Taking the predicted air quality-related index being PM2.5 as an example, the weight vector W is a vector composed of the similarity coefficients between CO, $NO_2$, $SO_2$, $O_3$, PM10, PM2.5, temperature, humidity, wind speed and wind direction, and PM2.5.

Figure 2A:
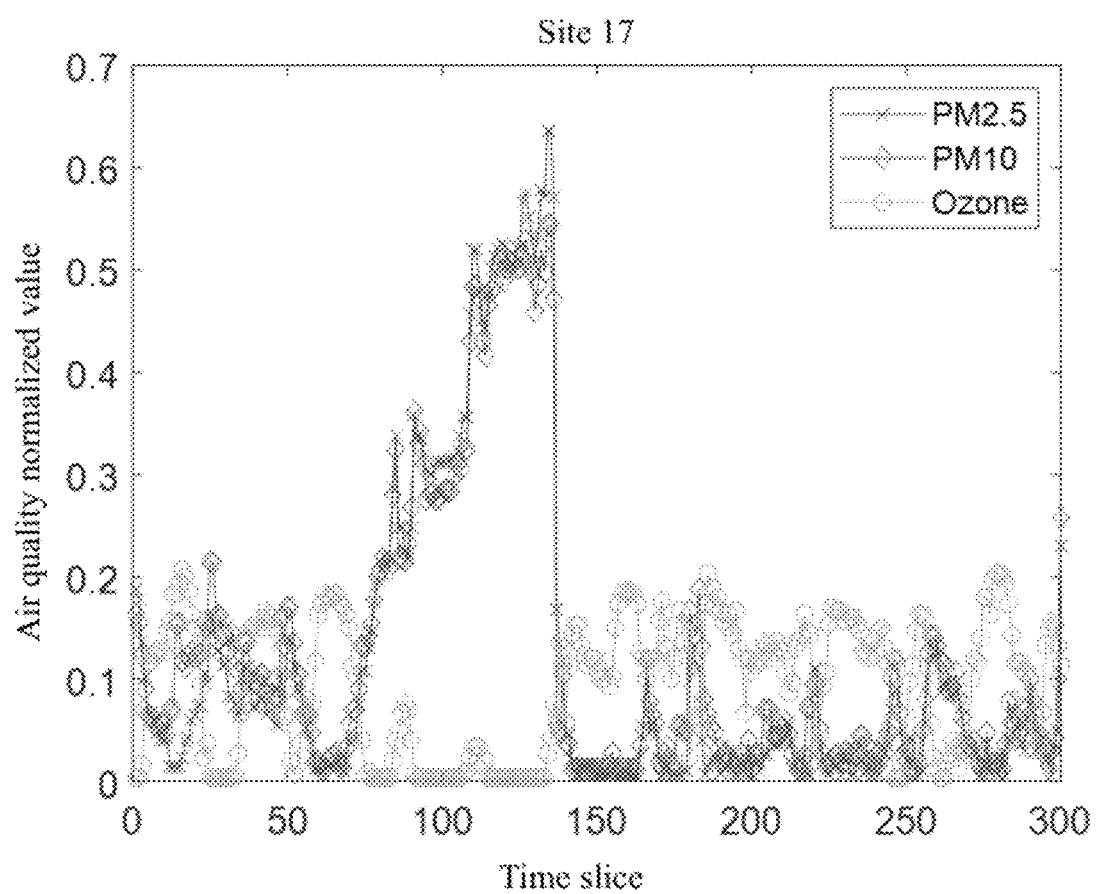
FIG. 2A is a data map of a maximum correlation attribute PM10 and a minimum correlation attribute ozone related to PM2.5 in a site 17 in one example of the present application.
Figure 2B:
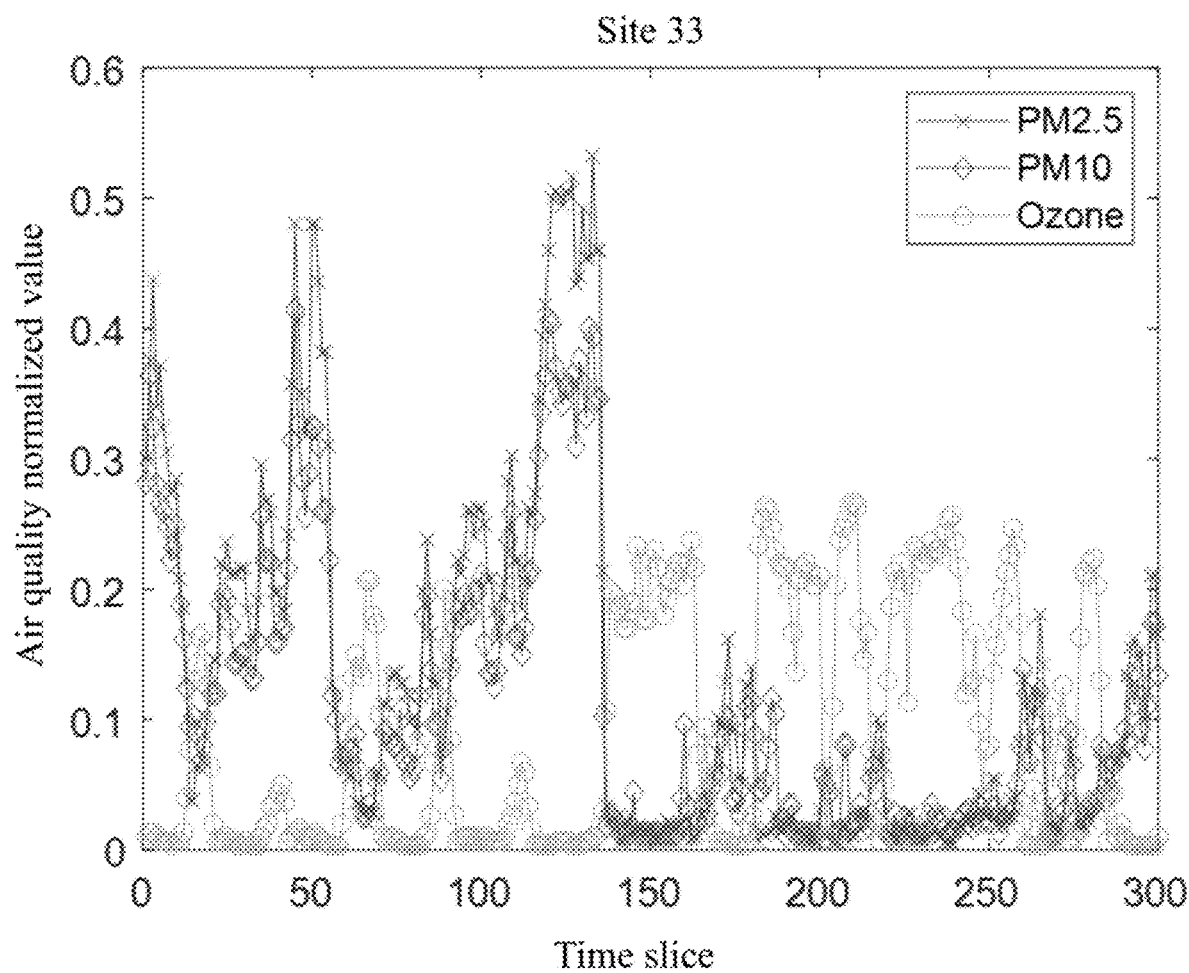
FIG. 2B is a data map of a maximum correlation attribute PM10 and a minimum correlation attribute ozone related to PM2.5 in a site 33 in one example of the present application.

Please refer to FIG. 2A and FIG. 2B, FIG. 2A is a data map of a maximum correlation attribute PM10 and a minimum correlation attribute ozone related to PM2.5 in a site 17, and FIG. 2B is a data map of a maximum correlation attribute PM10 and a minimum correlation attribute ozone related to PM2.5 in a site 33, it can be seen that the correlations between PM10 and $O_3$, and PM2.5 are not the same, and therefore, if weights of the monitoring targets are set to be the same according to the prior art, a predicted value thereof must not be accurate enough when predicting PM2.5. Therefore, the present application calculates the similarity coefficients between CO, $NO_2$, $SO_2$, $O_3$, PM10, PM2.5, temperature, humidity, wind speed and wind direction, and PM2.5, so as to subsequently select a spatial-temporal similarity site closest to the target site.

Secondly, using the dynamic time folding method to calculate the similarity value between each monitoring target in the air quality monitoring data collected by each site and the meteorological data and the corresponding monitoring target collected by the target site specifically includes:

taking the historical data of the same monitoring index collected by the target site and any site of other sites respectively as R and T:

$$R = r_1, r_2, \ldots, r_p, \ldots, r_m$$

$$T = t_1, t_2, \ldots, t_q, \ldots, t_m$$

constructing to obtain a m×m matrix, matrix elements (p,q) representing a distance $d(r_p, t_q)$ between two points of $r_p$ and $t_q$;

performing a DTW process on the constructed m×m matrix to obtain a DTW distance as a similarity value of the corresponding monitoring index.

In the DTW process, a constructed DTW path starts at the lower left corner of the matrix and ends at the upper right corner, and cannot achieves cross point matching or reverse matching, namely, for $w_{k-1} = (r', t')$, in the next step $w_k = (r, t)$, $0 \leq r - r' \leq 1$ and $0 \leq t - t' \leq 1$. In the present application, performing the DTW process on the same monitoring target of other sites and the target site so as to obtain the similarity value between each monitoring target of any site of the other sites and the monitoring target corresponding to the target site, and constituting a distance vector $DTW_R$.

For example, when calculating the distance vector $DTW_R$ of the site 17 and the site 33, taking historical data of the same monitoring target of the site 17 and the site 33 as R and T respectively to perform the above-mentioned DTW process to obtain the DTW distance, namely a similarity value corresponding to the monitoring target, and constituting the DTW distance of the monitoring target in all the air quality monitoring data and the meteorological data into the distance vector $DTW_R$, namely: respectively calculating the DTW distance between CO, $NO_2$, $SO_2$, $O_3$, PM10, PM2.5, temperature, humidity, wind speed and wind direction collected by the site 17 and the monitoring target corresponding to the site 33, and constituting the distance vector $DTW_R$.

Multiplying the weight vector W by the distance vector $DTW_R$ again to take a reciprocal to obtain the spatial-temporal similarity between each air quality monitoring site and the target site.

For example, there are 35 monitoring sites in a certain city, taking the site 33 as the target site and PM2.5 of the site 33 after a period of time as the air quality-related index to be predicted, then in 34 other sites except the site 33, multiplying the distance vector $DTW_R$ between any site and the site 33 by the weight vector W composed of the similarity coefficients between CO, $NO_2$, $SO_2$, $O_3$, PM10, PM2.5, temperature, humidity, wind speed and wind direction, and PM2.5 to take a reciprocal, namely, the spatial-temporal similarity between this site and the site 33.

Ranking the spatial-temporal similarity between each site and the site 33, and selecting a predetermined number of sites according to the size as the spatial-temporal similarity sites of the site 33. In the subsequent simulation experiment of the present application, five sites with high ranking of the spatial-temporal similarity are selected for prediction. A number of the spatial-temporal similarity sites can be determined according to actual requirements.

Figure 3A:
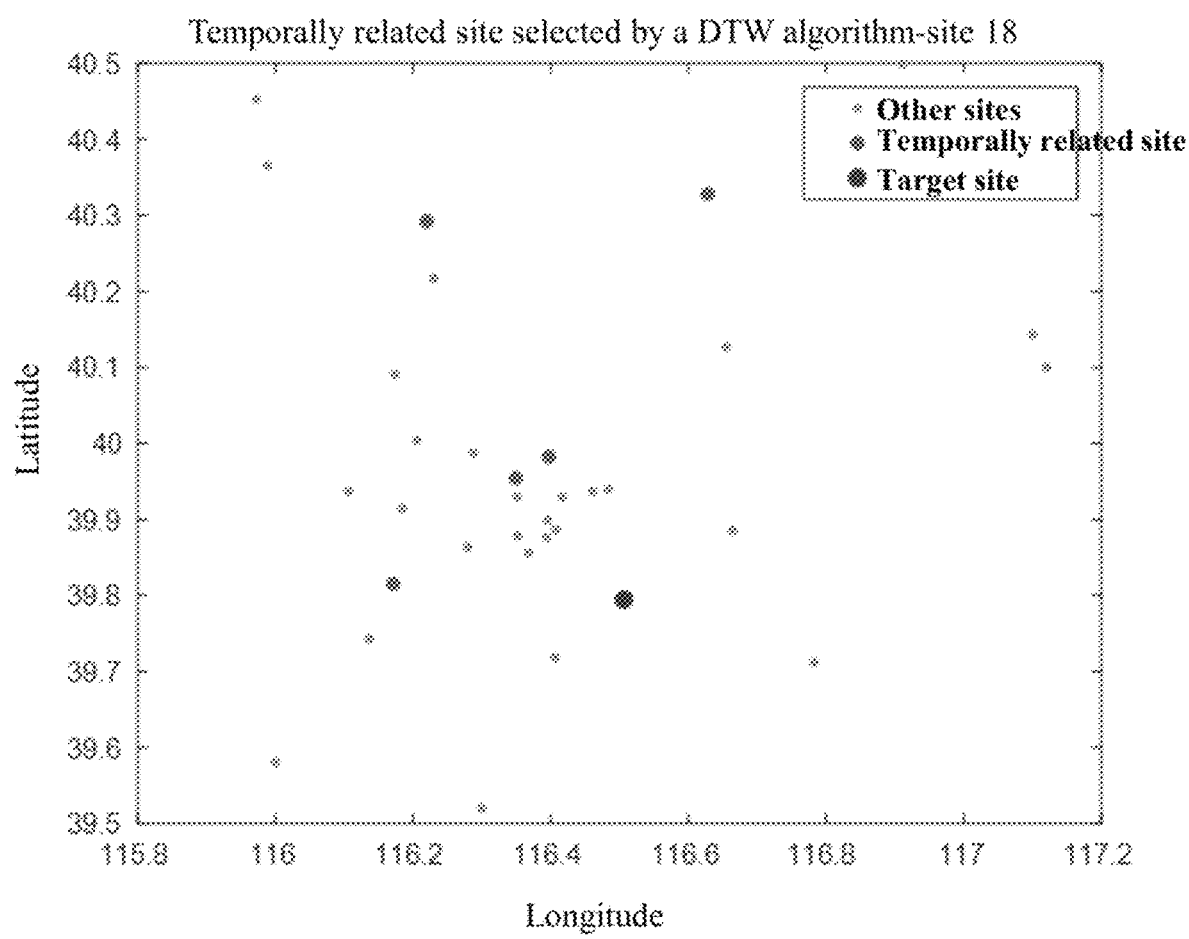
FIG. 3A is a related site selection diagram for an existing DTW algorithm.
Figure 3B:
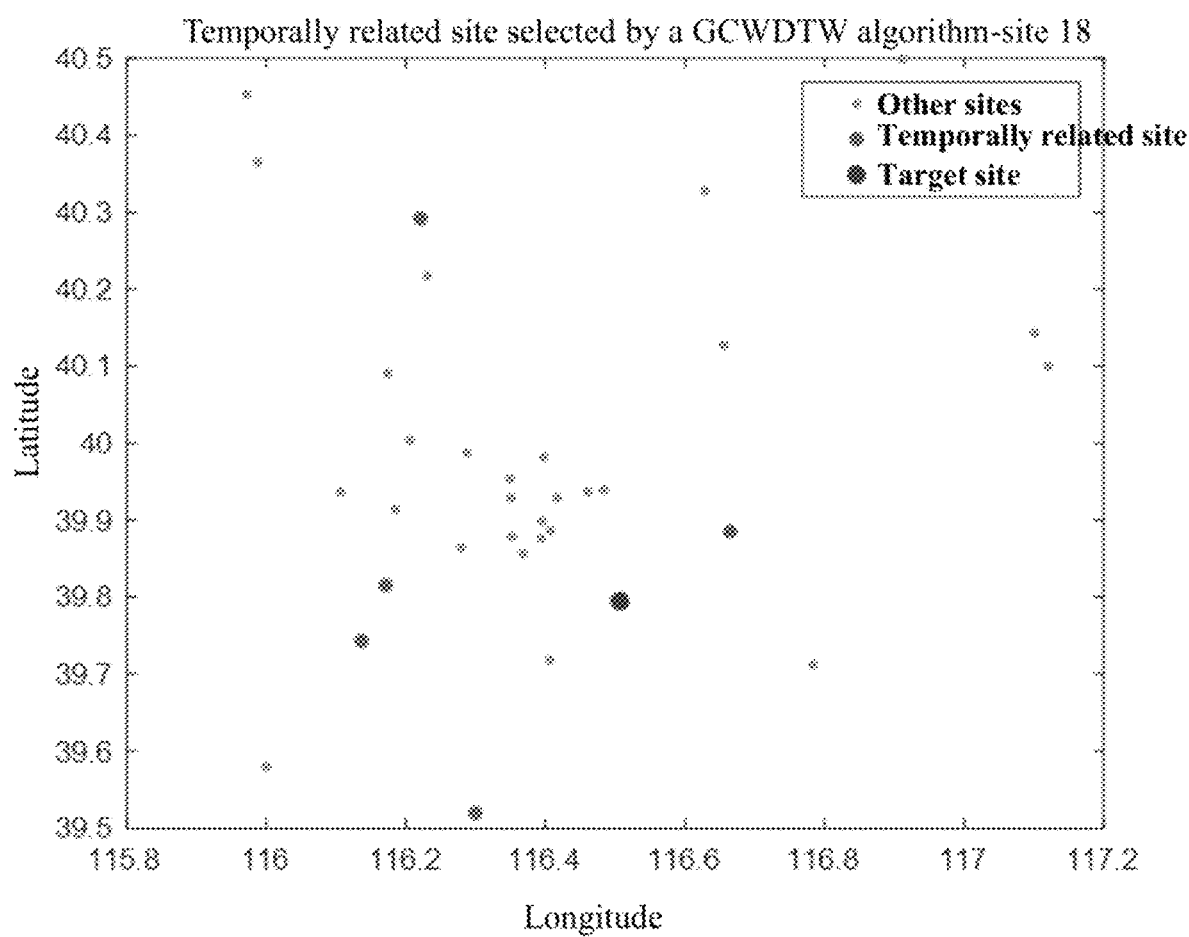
FIG. 3B is a related site selection diagram for a GCWDTW algorithm proposed in the present application.

Please refer to FIG. 3A and FIG. 3B, FIG. 3A is a related site selection result for an existing DTW algorithm, FIG. 3B is a related site selection result for a GCWDTW algorithm proposed in the present application, and it can be seen that the site selected by the method of the present application is different from that selected by the existing DTW algorithm.

For the selection of the geographic neighbor sites, the KNN algorithm can be used for screening. The KNN algorithm can refer to "Hastie T, Tibshirani R. Discriminant adaptive nearest neighbor classification [J]. IEEE transactions on pattern analysis and machine intelligence, 1996, 18 (6): 607-616", and will not be described again in the present application.

In the present application, when determining the similarity coefficient between each monitoring target in the air quality monitoring data collected by the target site and the meteorological data and the predicted air quality-related index, the similarity coefficient is determined according to the improved Granger causality, and it is well known that a Granger causality test is a statistical estimation, and as shown by the following formula, is used to test whether a factor X has a causality with a factor Y:

$$F = GC(Y, X)$$

where F is an F-distribution value of the Granger causality test and GC represents the Granger causality test process.

However, an original Granger causality test cannot obtain an indexity coefficient, and only can judge whether hypothesis verification is accepted or rejected. The present application quantifies the index along according to the idea of the Granger causality test so as to obtain an indexity data, obtains coefficients of other data of the same site to target data according to a degree of similarity, and obtains a new function:

$$W = SGC(Y, X)$$

where SGC denotes the similarity coefficient of GC, and the similarity of the same site is as shown in FIG. 2. In the present application, the existing data is divided into air quality monitoring data $P_m$ and meteorological data $M_n$.

For the air quality monitoring data $P_m$, only the historical data can be acquired, and while for the meteorological data $M_n$, predicted data can be acquired. Acquisition methods of these two data are different, which determines that lag parameters of a Granger causality coefficient are different, because a change trend of PM2.5 and other pollutants is more synchronous in time span, while the influence of atmospheric factors on pollutants normally have some lag effect. However, just as said above that the results of the Granger causality test can only be used as a reference, the causality between two time series cannot be completely determined, and since the Granger causality test uses a method of linear regression to analyze the correlation, it cannot work well for the analysis in some cases, so it is impossible to comprehensively judge the similarity between the sites using only improved SGC, and thus it is only used as a coefficient.

In order to verify the effectiveness of the model proposed in the present application, the present application collects the air quality monitoring data from 35 sites in Beijing from May 1, 2014 to Apr. 30, 2018 and meteorological data, where the air quality data is sampled every hour, and the atmospheric data is updated every hour in units of administrative regions, including weather forecast data updated every 3 hours. Air quality data includes CO, $NO_2$, $SO_2$, $O_3$, PM10, and PM2.5, and the meteorological data includes temperature, humidity, wind speed, and wind direction. Data are normalized prior to experiments.

Figure 4:
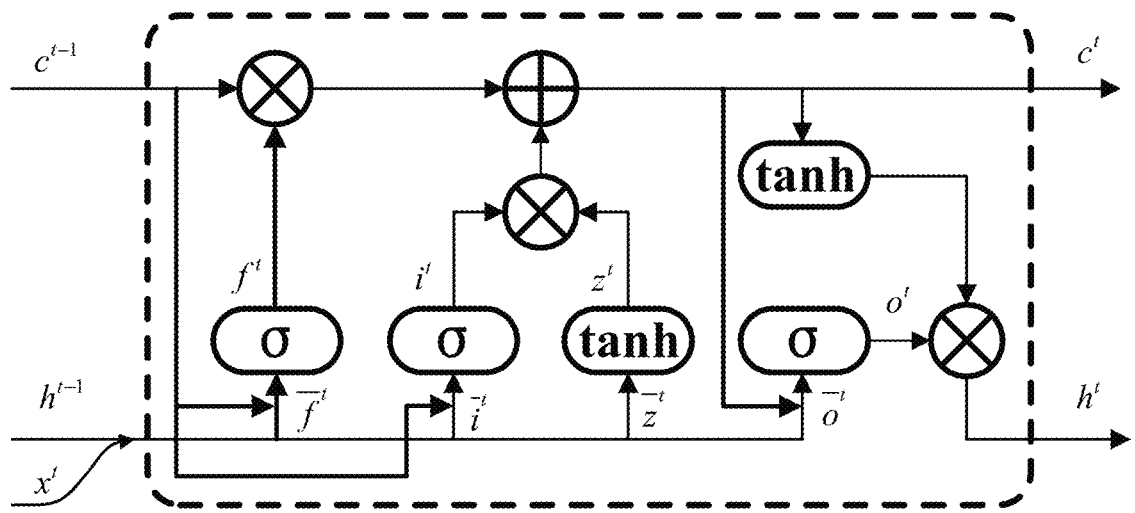
FIG. 4 is an internal structure diagram of LSTM.

The present application finally uses a two-layer hidden layer network, where a former layer is an LSTM network layer, being traditional nodes, and a number of the nodes is 30, and a latter layer is a fully connected layer, with a number of nodes being 50, where for a structure selected by the LSTM, please refer to FIG. 4. During training, taking training sets and test sets in 10:1, using an SGD updating mode, and setting batch as 40, a training epoch being 100 generations, and an initial learning rate being 1, and decreasing by 0.99 per generation. An initial weight of the LSTM network is set randomly.

In the present application, a total of three indexes are used, namely, a mean absolute error (MAE), a root-mean squared error (RMSE) and accuracy (Acc.).

MAE, RMSE, and Acc are defined as follows:

$$MAE = \frac{\sum_i |\hat{y}_i - y_i|}{n}$$

$$RMSE = \sqrt{\frac{\sum_i (\hat{y}_i - y_i)^2}{n}}$$

$$Acc = 1 - \frac{\sum_i |\hat{y}_i - y_i|}{\sum_i y_i}$$

In terms of experimental results, the present application makes a series of experiments to prove the superiority of the method of the present application.

1. In the present application, the prediction effects of the model when data selected by different data selection methods is used as input of a deep module are respectively compared, and table 1 summarizes all the experimental results, where L represents a model which does not use data of spatial-temporal related sites and only uses data of a local target site, L+N represents a model which uses data of the target site and spatially related sites, L+DTW represents a model of data of the target site and temporally related sites selected through the DTW algorithm, L+DTW+N represents a model which uses data of the target site and the spatial-temporal related site selected by the DTW algorithm, and finally, the Deep-STS method is a finally determined model using data of the target site and the spatial-temporal related site selected by a GCWDTW method in the present application.

Figure 5A:
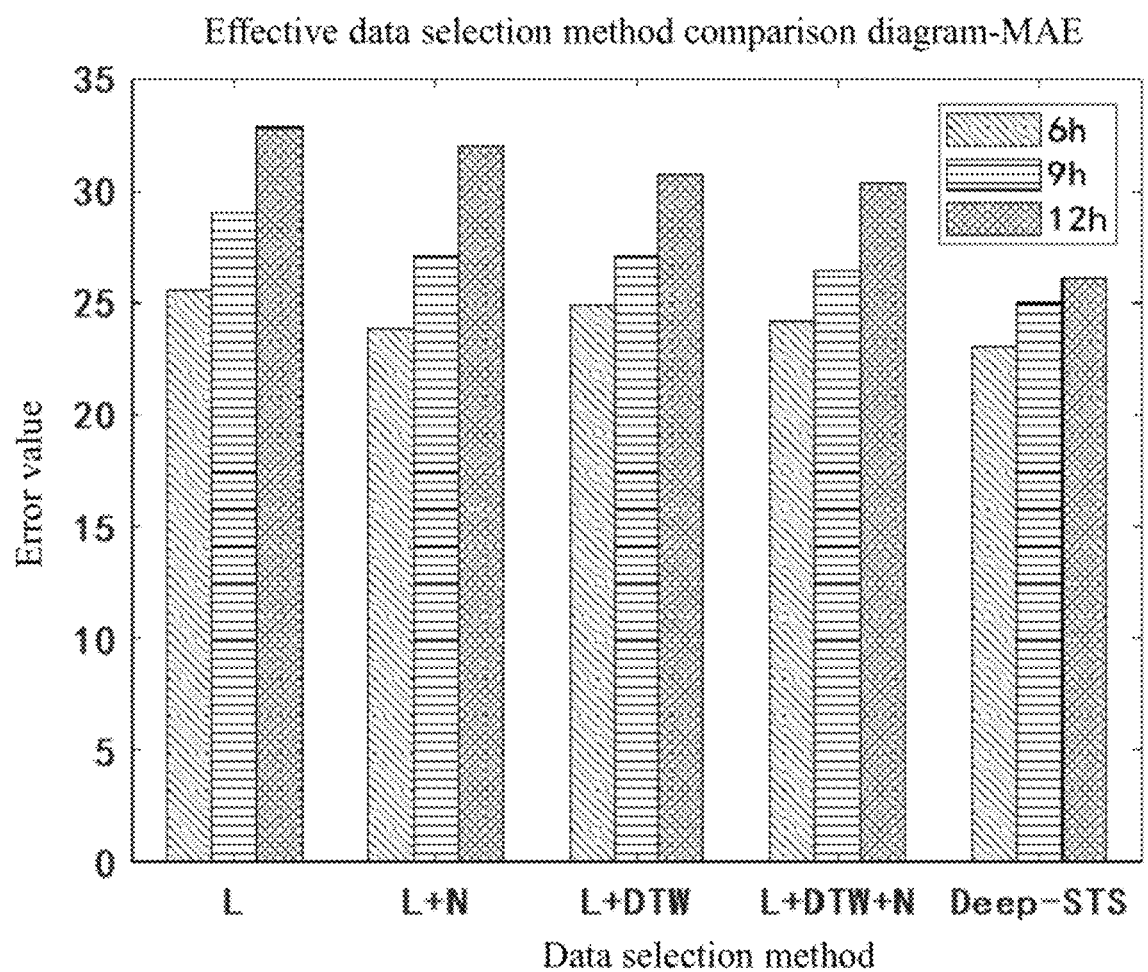
FIG. 5A is an MAE diagram for effectiveness of a data selection method.
Figure 5B:
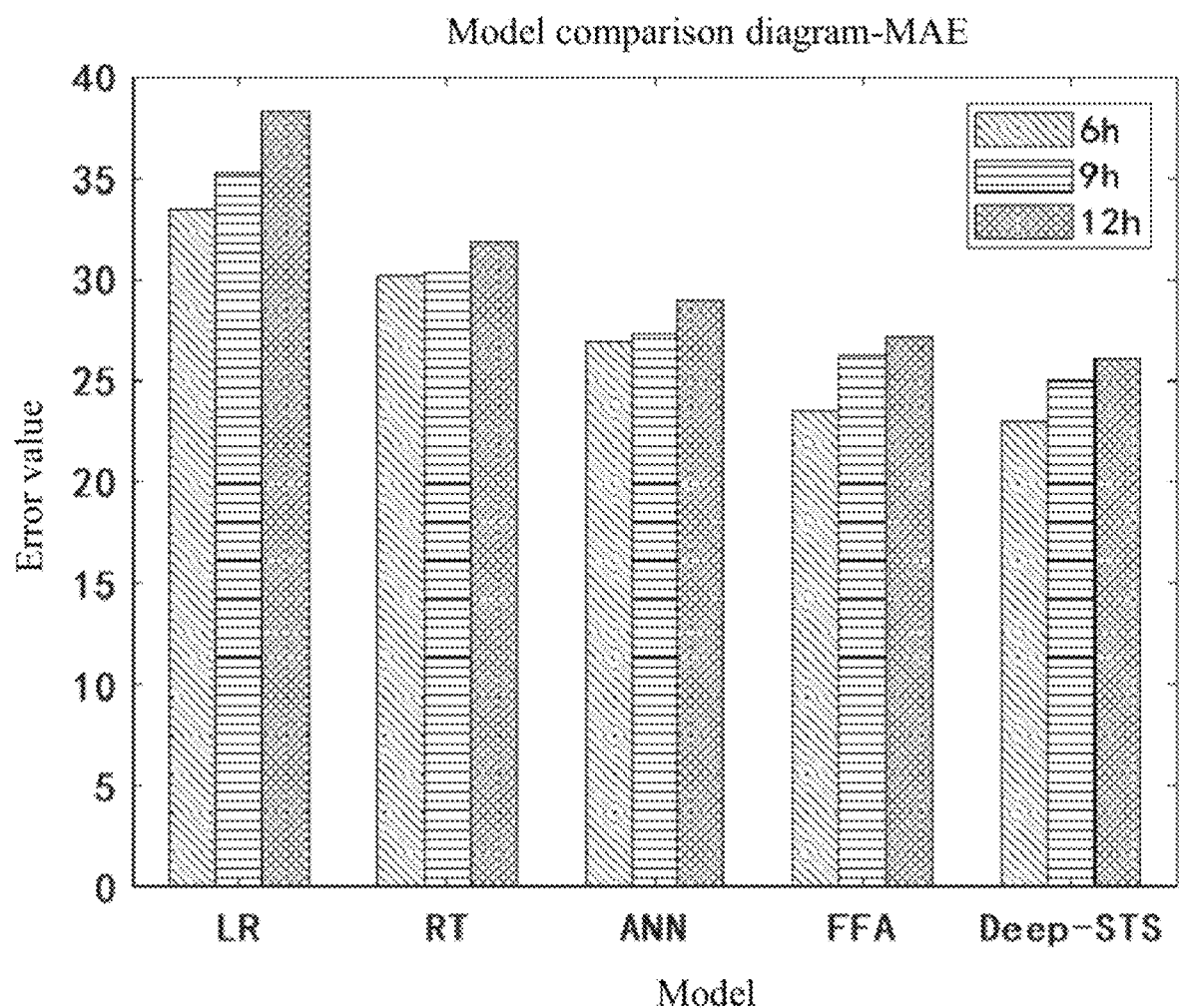
FIG. 5B is a diagram comparing MAE indexes for different prediction models.
Figure 6A:
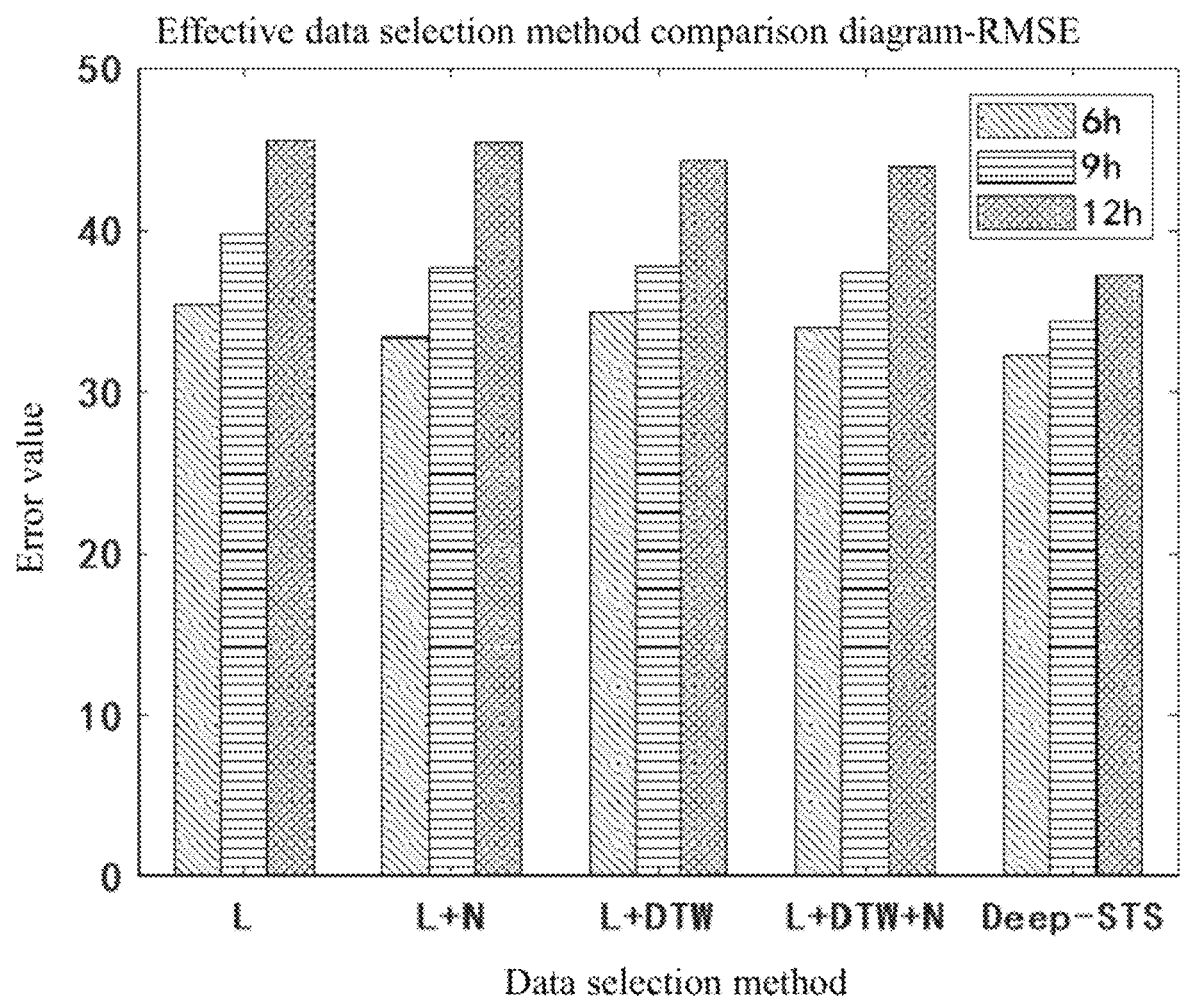
FIG. 6A is an RMSE diagram for effectiveness of the data selection method.
Figure 6B:
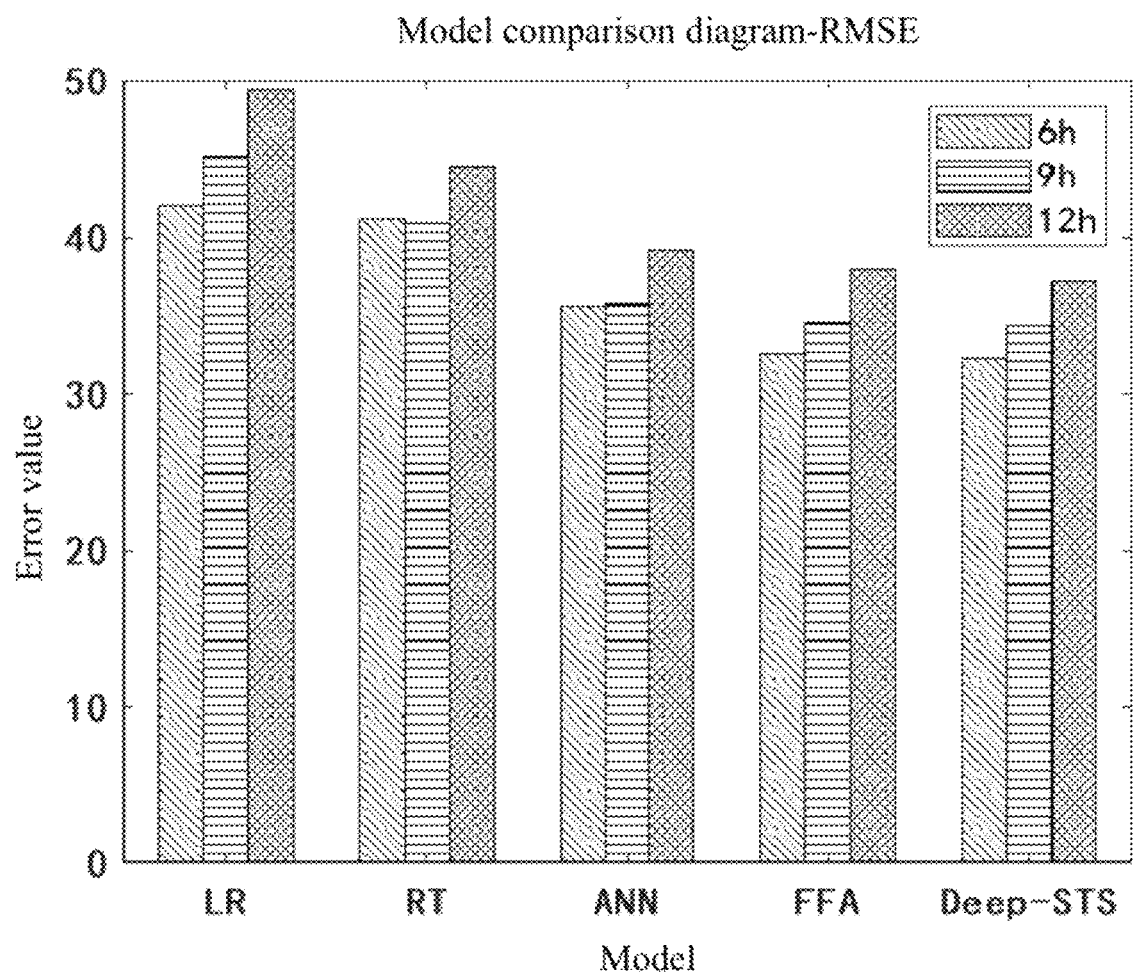
FIG. 6B is diagram comparing RMSE indexes for different prediction models.
Figure 7A:
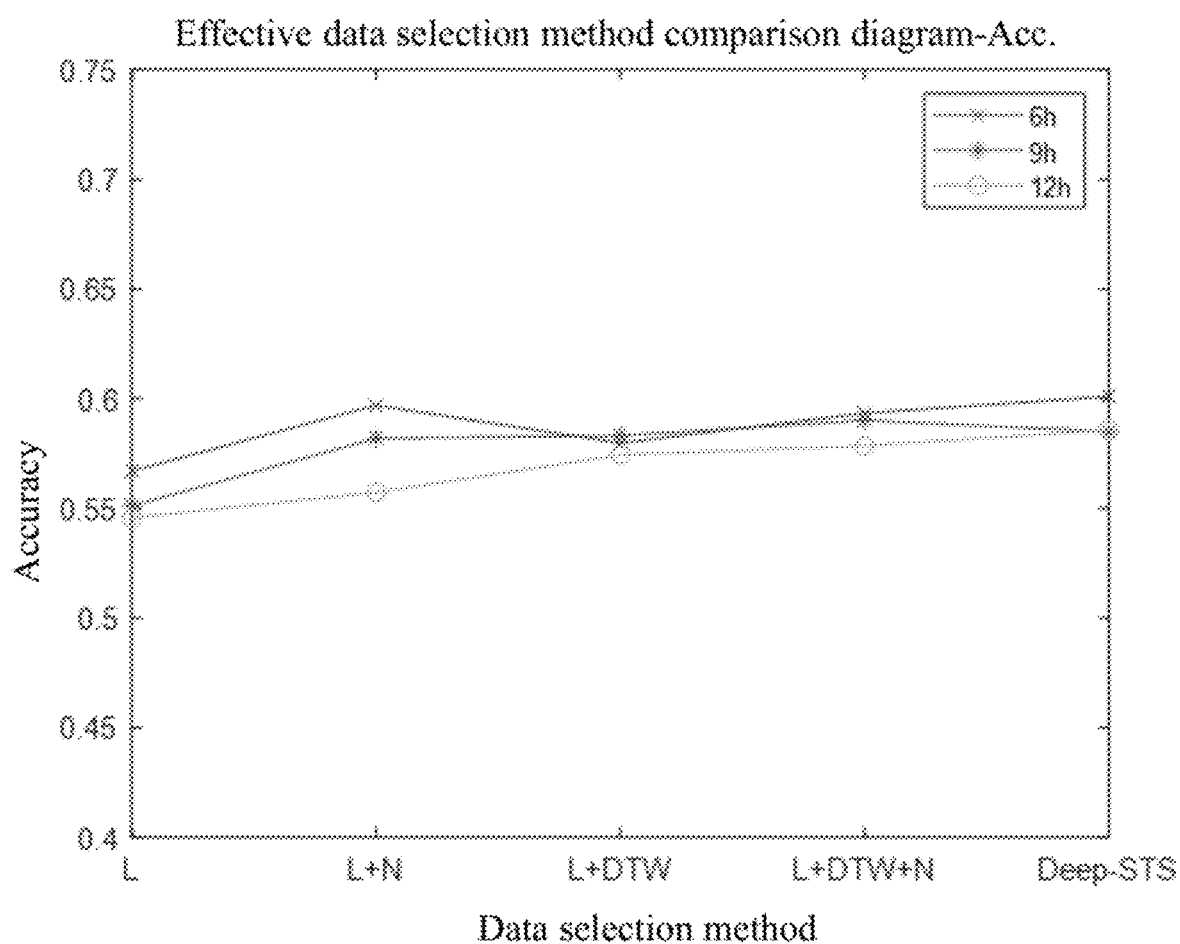
FIG. 7A is an Acc. diagram for effectiveness of the data selection method.
Figure 7B:
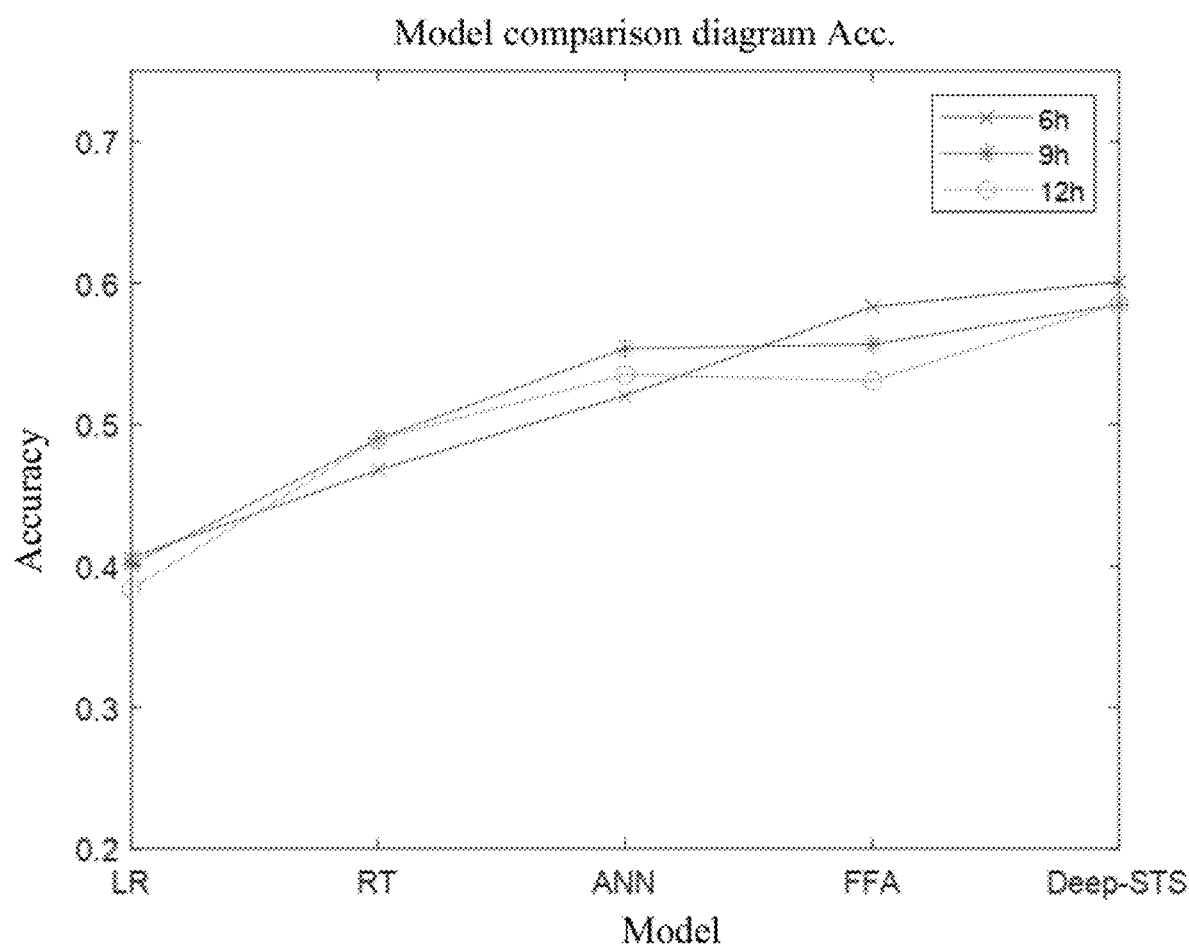
FIG. 7B is a diagram comparing Acc. indexes for different prediction models.
Figure 8A:
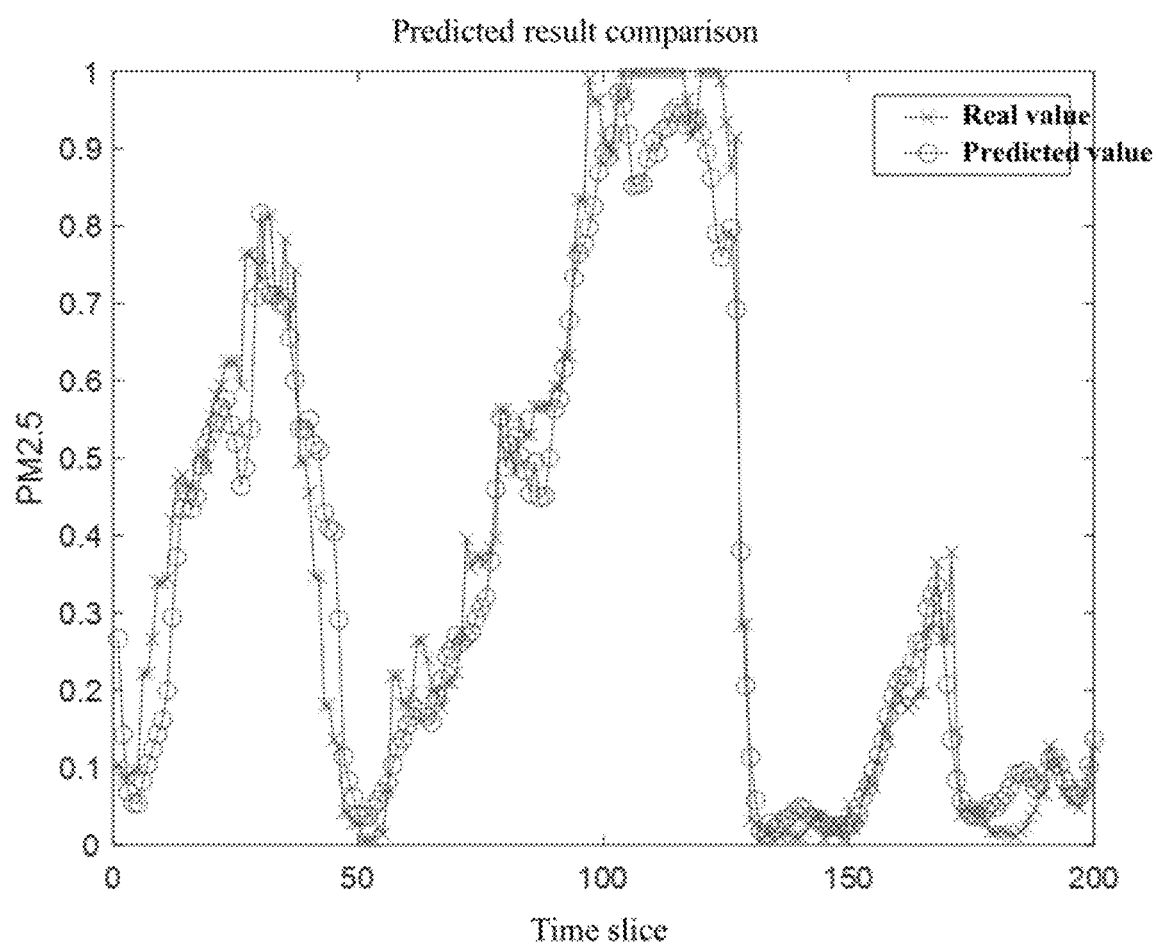
FIG. 8A is a simulated comparison diagram of a predicted result for predicting PM2.5 of a site 19 by using a method of the present application and a real value.
Figure 8B:
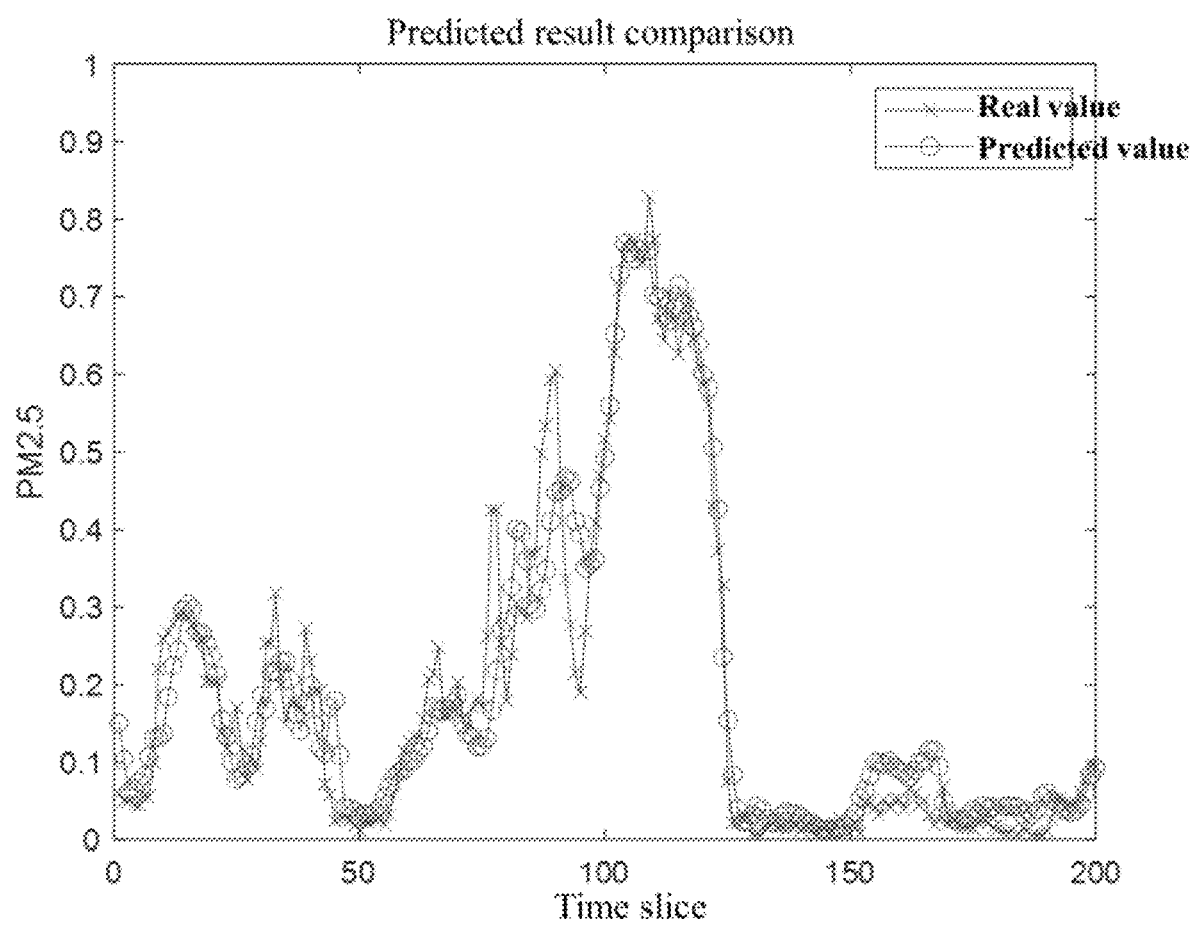
FIG. 8B is a simulated comparison diagram of a predicted result for predicting PM2.5 of a site 32 by using the method of the present application and a real value.

It can be seen from FIG. 5A, FIG. 5B, FIG. 6A, FIG. 6B, FIG. 7A, FIG. 7B and table 1 that the prediction effect of the Deep-STS method of the present application is far lower than that of other data selection methods in both an MAE index and an RMSE error index. Referring to FIGS. 5A and 5B, it can be seen that at 6 h, 9 h and 12 h, its MAE error is reduced by 4.7%, 5.6% and 14.1% compared to the L+DTW+N model with the best effect, and similarly, with reference to FIGS. 6A and 6B, it can be seen that its RMSE error is reduced by 5.0%, 8.2% and 15.4% compared to the L+DTW+N model. The experimental results show that a data screening method proposed in the present application is very effective, and the effect of improvement of a GCWDTW performance versus improvement of a DTW performance becomes more obvious as a prediction time interval increases. With reference to FIGS. 7A and 7B, it can be seen that in comparison of the data selection modes, the prediction accuracy of Deep-STS is slightly lower than that of the L+DTW+N model only in the case of 9 h prediction, and in the other cases, it is a model with the highest accuracy, while in comparison with existing models, the prediction accuracy of Deep-STS increases more with the increase of the prediction time interval.

2. The present application compares the performance of the classical algorithm models LR, RT, and ANN and the milestone FFA model in the art with the performance of the Deep-STS designed in the present application. It can be seen from the figures that FFA has a great improvement in performance compared with other classical models, while Deep-STS has a slight advantage over FFA in each index, and its accuracy rate is increases by 3.0%, 5.1% and 10.3% respectively compared with the FFA model under the prediction intervals of 6 h, 9 h and 12 h. The experiment demonstrates the superiority of the experimental model Deep-STS proposed in the present application, and also shows that a deep learning module has a good ability to solve practical problems.

TABLE 1

| | All results of this paper | | | | | | | | |
|---|---|---|---|---|---|---|---|---|---|
| | MAE | | | RMSE | | | Acc. | | |
| | 6 h | 9 h | 12 h | 6 h | 9 h | 12 h | 6 h | 9 h | 12 h |
| LR | 33.45 | 35.32 | 38.33 | 42.02 | 45.23 | 49.31 | 0.4062 | 0.4014 | 0.3841 |
| RT | 30.19 | 30.36 | 31.89 | 41.09 | 40.81 | 44.46 | 0.4679 | 0.4901 | 0.4898 |
| ANN | 26.88 | 27.32 | 28.97 | 35.64 | 35.67 | 39.20 | 0.5207 | 0.5539 | 0.5354 |
| FFA | 23.53 | 26.23 | 27.13 | 32.57 | 34.48 | 38.00 | 0.5835 | 0.5568 | 0.5312 |
| L | 25.57 | 28.98 | 32.81 | 35.39 | 39.77 | 45.52 | 0.5670 | 0.5511 | 0.5457 |
| L + N | 23.81 | 27.06 | 31.97 | 33.31 | 37.72 | 45.43 | 0.5970 | 0.5819 | 0.5572 |
| L + DTW | 24.90 | 27.03 | 30.72 | 34.89 | 37.79 | 44.31 | 0.5798 | 0.5831 | 0.5743 |
| L + DTW + N | 24.17 | 26.47 | 30.33 | 33.94 | 37.38 | 43.95 | 0.5934 | 0.5901 | 0.5785 |
| Deep-STS | 23.03 | 24.99 | 26.07 | 32.23 | 34.31 | 37.17 | 0.6010 | 0.5850 | 0.5857 |

It can be seen from the above table 1 that in all the comparison algorithms used in the present application, except that the Acc. index of 9 h is 0.51% lower than that of L+DTW+N, other indexes are the most superior in all the models. A highest 10.01% improvement in the aspects of MAE and Acc. is also achieved compared to the representative prediction model FFA.

Some steps in the examples of the present disclosure can be implemented by software, and a corresponding software program can be stored in a readable storage medium, such as an optical disk or a hard disk.

What is described above is only preferred examples of the present disclosure, and is not intended to limit the present disclosure, and any modification, equivalent replacement, improvement and the like made within the spirit and principle of the present disclosure shall be included in the protection range of the present disclosure.

What is claimed is:

1. A method for air quality prediction based on deep spatial-temporal similarity, wherein the method is for predicting air quality-related index data of a target site, and the method comprises:
    S1, acquiring air quality monitoring data collected by each air quality monitoring site and meteorological data, the air quality monitoring data comprising historical data of CO, $NO_2$, $SO_2$, $O_3$, PM10 and PM2.5, and the meteorological data comprising historical data of temperature, humidity, wind speed and wind direction;
    S2, determining similarity coefficients between each monitoring target in air quality monitoring data collected by the target site and the meteorological data and predicted air quality-related indexes according to an improved Granger causality;
    S3, using a dynamic time folding method to calculate a similarity value between each monitoring target in the air quality monitoring data collected by each site and the meteorological data and a corresponding monitoring target collected by the target site;
    S4, determining spatial-temporal similarity between each air quality monitoring site and the target site according to the similarity coefficient determined in S2 and the similarity value determined in S3;
    S5, selecting a predetermined number of air quality monitoring sites as spatial-temporal similarity sites of the target site according to a magnitude of the spatial-temporal similarity between each air quality monitoring site and the target site determined in S4; and
    S6, taking the air quality monitoring data collected by the target site and the meteorological data, air quality monitoring data collected by the spatial-temporal similarity site of the target site and the meteorological data, and air quality monitoring data collected by geographical neighbour sites determined according to location information and the meteorological data as inputs of a long short term memory network (LSTM) model respectively to obtain corresponding output results, and then performing support vector regression (SVR) integration on each output result corresponding to the LSTM model to obtain predicted values of the air quality-related index data of the target site;
    wherein the air quality-related index is any monitoring target in the air quality monitoring data.

2. The method according to claim 1, wherein determining the similarity coefficients between each monitoring target in the air quality monitoring data collected by the target site and the meteorological data and the predicted air quality-related indexes according to the improved Granger causality comprises:
    determining the similarity coefficient between each monitoring target in the air quality monitoring data collected by the target site and the meteorological data and the predicted air quality-related index according to Formula (3), and constituting a weight vector W:

$$W = SGC(A, B) \quad (1)$$

wherein A represents the predicted air quality-related index, and B represents other monitoring targets other than the air quality-related index in the air quality monitoring data collected by the target site and the meteorological data.

3. The method according to claim 2, wherein determining the similarity coefficient between each monitoring target in the air quality monitoring data and the meteorological data and the predicted air quality-related index according to Formula (1) comprises:
    acquiring the air quality monitoring data collected by the target site and the meteorological data; performing linear regression processing on the air quality monitoring data collected by the target site and the meteorological data twice to obtain the similarity coefficient between each monitoring target and the predicted air quality-related index:
    S2.1, selecting m historical data in sequence according to time to constitute A and B;

$$A = [a_1, a_2, \ldots, a_p, \ldots, a_{m-1}, a_m]^T$$

$$B = [b_1, b_2, \ldots, b_q, \ldots, b_{m-1}, b_m]^T$$

wherein $a_p$ represents the historical data of the air quality-related index in the air quality monitoring data collected by the target site; $b_q$ represents the historical data of the other monitoring targets other than the air quality-related index in the air quality monitoring data collected by the target site and the meteorological data; m represents a number of the historical data;
    S2.2, performing first-time linear regression operation: selecting i+1 to $m_{th}$ data in A to constitute $A_{1,i} = [a_{i+1}, a_{i+2}, \ldots, a_m]^T$;
    generating a lag matrix $Z_{1,i}$ according to the data in A;

$$Z_{1,i} = \begin{pmatrix} 1 & a_i & a_{i-1} & \cdots & a_1 \\ 1 & a_{i+1} & a_i & \cdots & a_2 \\ \vdots & \vdots & \vdots & \vdots & \vdots \\ 1 & a_{m-1} & a_{m-2} & \cdots & a_{m-i-1} \end{pmatrix}$$

wherein i is lag time in the first-time linear regression operation, $i \in (0, L]$, and L is maximum lag time;
    obtaining an error corresponding to the lag time i according to the following formula:

$$e_{1,i} = f_{LR}(A_{1,i} | Z_{1,i})$$

obtaining an error vector $e_1 = \{e_{1,i}\}$; $f_{LR}$ representing linear regression operation;
    taking a minimum error vector $e_{1,s} = \min(e_1)$, wherein s is lag time corresponding to a minimum value in the error vector $e_1$;
    S2.3, performing second-time linear regression operation: selecting j+s+1 to $m_{th}$ data in A to constitute $A_{2,j} = [a_{j+s+1}, a_{j+s+2}, \ldots, a_m]^T$;
    generating a lag matrix $Z_{2,j}$ according to the data in A and B:

$$Z_{2,j} = \begin{pmatrix} 1 & a_{j+s} & \ldots & a_{j+1} & b_{j+s+1} & \ldots & b_{s+1} \\ \vdots & \vdots & \vdots & \vdots & \vdots & \vdots & \vdots \\ 1 & a_{m-1} & \ldots & a_{m-s} & b_m & \ldots & b_{m-j+1} \end{pmatrix}$$

wherein j is lag time in the second-time linear regression operation, j∈(0,s];

obtaining an error corresponding to the lag time j according to the following formula:

$$e_{2,j} = f_{LR}(A_{2,j}|Z_{2,j})$$

obtaining an error vector e2={$e_{2,j}$};

taking a smallest error vector $e_{2,final}$=min($e_2$) in e2;

S2.4, mapping $e_{2,final}$ into an interval of (0,1]:

$$I = \frac{1}{1 + e_{2,fianl}}$$

and using I as the similarity coefficient between each corresponding monitoring target and the predicted air quality-related index.

4. The method according to claim 3, wherein determining the spatial-temporal similarity between each air quality monitoring site and the target site according to the similarity coefficient determined in S2 and the similarity value determined in S3 comprises:

recording a vector composed of the similarity values between each monitoring target in the air quality monitoring data and the meteorological data and the corresponding monitoring target collected by the target site calculated in S3 as $DTW_R$;

recording a vector composed of the similarity coefficients between each monitoring target in the air quality monitoring data and the meteorological data and the predicted air quality-related index determined in S2 as a weight vector W; and multiplying the weight vector W by the distance vector $DTW_R$ to take a reciprocal to obtain the spatial-temporal similarity between each air quality monitoring site and the target site.

5. The method according to claim 4, wherein using the dynamic time folding method to calculate the similarity value between each monitoring target in the air quality monitoring data collected by each site and the meteorological data and the corresponding monitoring target collected by the target site comprises:

taking the historical data of the same monitoring index collected by the target site and any site of other sites respectively as R and T:

$$R = r_1, r_2, \ldots, r_p, \ldots, r_m$$

$$T = t_1, t_2, \ldots, t_q, \ldots, t_m$$

constructing to obtain a m×m matrix, matrix elements (p,q) representing a distance d($r_p$,$t_q$) between two points of $r_p$ and $t_q$;

performing a DTW process on the constructed m×m matrix to obtain a DTW distance as a similarity value of the corresponding monitoring index.

6. The method according to claim 5, wherein the distance d($r_p$,$t_q$) is an Euclidean distance between the two points of $r_p$ and $t_q$.

7. The method according to claim 1, further comprising: after the S1 and before S2: pre-processing the air quality monitoring data collected by each air quality monitoring site and the meteorological data acquired in S1.

8. The method according to claim 7, wherein the pre-processing comprises:

complementing missing data by using a method of interpolation or mean values.

9. The method according to claim 1, wherein taking the air quality monitoring data collected by the target site and the meteorological data, the air quality monitoring data collected by the spatial-temporal similarity site of the target site and the meteorological data, and the air quality monitoring data collected by the geographical neighbour sites determined according to the location information and the meteorological data as the inputs of the long short term memory network (LSTM) model respectively comprises:

taking the historical data of the air quality-related indexes in the air quality monitoring data collected by the target site as input data of the LSTM model to obtain a first output result;

taking the historical data of the monitoring targets other than the air quality-related indexes in the air quality monitoring data collected by the target site and the historical data of the meteorological data as input data of the LSTM model to obtain a second output result;

taking the historical data of the air quality-related indexes in the air quality monitoring data collected by the spatial-temporal similarity site of the target site as input data of the LSTM model to obtain a third output result;

taking the historical data of the monitoring target other than the air quality-related indexes in the air quality monitoring data collected by the spatial-temporal similarity site of the target site and the historical data of the meteorological data as input data of the LSTM model to obtain a fourth output result; and taking the air quality monitoring data collected by the geographical neighbour site determined according to the location information and the historical data of the meteorological data as input data of the LSTM model to obtain a fifth output result.

10. The method according to claim 9, wherein performing support vector regression (SVR) integration on each output result corresponding to the LSTM model to obtain the predicted values of the air quality-related index data of the target site comprises:

performing support vector regression (SVR) integration on the first output result to the fifth output result of the LSTM model to obtain the predicted values of the air quality-related index data of the target site.

\* \* \* \* \*